(12) United States Patent  
Garcia et al.

(10) Patent No.: US 8,250,407 B1  
(45) Date of Patent: Aug. 21, 2012

(54) METHODS AND SYSTEMS FOR CORRECTION OF DATA TRANSACTIONS

(75) Inventors: Rebecca J. Garcia, Federal Way, WA (US); William E. Wojczyk, Jr., O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 51 days.

(21) Appl. No.: 12/869,248

(22) Filed: Aug. 26, 2010

(51) Int. Cl.  
*G06F 11/00* (2006.01)

(52) U.S. Cl. ............... 714/15; 714/4.1; 714/18; 714/21; 714/48; 714/19; 714/57

(58) Field of Classification Search .................. 714/4.1, 714/15, 18, 21, 48, 49, 57  
See application file for complete search history.

(56) References Cited

U.S. PATENT DOCUMENTS

| | | | |
|---|---|---|---|
| 5,557,780 A * | 9/1996 | Edwards et al. | 703/27 |
| 2003/0145103 A1 * | 7/2003 | Pruyne et al. | 709/237 |

OTHER PUBLICATIONS

Unknown, ATA SPEC2000 E-Business Specification for Materials Management, 2009, 16 pages, Revision 2009.1 (17th Revision), Air Transport Association of America, Inc., US.

* cited by examiner

*Primary Examiner* — Charles Ehne  
(74) *Attorney, Agent, or Firm* — Armstrong Teasdale LLP

(57) ABSTRACT

Methods and apparatus for use in correcting a data transaction. A data transaction including a plurality of transaction values is received from a data provider. At least a portion of the transaction values is validated. When the validation of at least one transaction value fails, a validation failure notification including a link is provided to a user. When the link is selected, the transaction values are provided via a presentation interface, and erroneous transaction values are distinguished from non-erroneous transaction values. A correction request message including the erroneous transaction values may be generated and sent to a user associated with the data provider. A revised transaction may be received from the data provider and executed to correct the erroneous transaction values.

21 Claims, 8 Drawing Sheets

METHODS AND SYSTEMS FOR CORRECTION OF DATA TRANSACTIONS

BACKGROUND

The field of the disclosure relates generally to systems used to execute data transactions, and more specifically, to methods and systems for detecting data field errors, for notifying users of and correcting invalid data within data transactions.

At least some known computer systems accept data transactions, such as additions or updates, from an external data provider and apply those data transactions to a local database. However, it is common for such data transactions to include invalid data. For example, a data value within a transaction may be outside a domain of legal or expected values. Invalid data generally renders the local database corrupt or may cause a failure in the execution of a data transaction against the database.

Some known systems detect failed transactions and report such transaction failures in a log file. Often, a log file may contain non-transaction-related system failures, informational messages, and/or non-critical warnings, and such a file may be output as unstructured text. The volume and the format of messages within a log file may increase the difficulty of determining whether and why a particular transaction has failed. Moreover, correcting invalid data may require significant manual coordination with the data provider that provided the data transaction. Additionally, in some cases, invalid data may be applied to a database without generating a transaction failure. In such cases, the invalidity of the data may not be apparent until it causes some type of error in the future. Fully resolving the invalidity at that point, may require considerable investigation of how and when the invalid data were created in the database and what other data may be affected.

BRIEF DESCRIPTION

In one aspect, a method is provided for use in correcting a data transaction. The method includes receiving at a computer system a data transaction from a remote data provider. The data transaction includes at least a plurality of transaction values. At least a portion of the transaction values is validated by the computer system to create a set of zero or more erroneous transaction values and a set of zero or more non-erroneous transaction values. When the set of erroneous transaction values includes at least one transaction value, an error state is associated with the data transaction, and a validation failure notification is provided to a user. The validation failure notification includes a data transaction link. When the data transaction link is selected, the transaction values are provided via a presentation interface. Erroneous transaction values are distinguished from non-erroneous transaction values.

In another aspect, a system is provided for use in correcting a data transaction. The system includes a communications unit, a processor unit that is coupled to the communications unit, and a presentation interface that is coupled to the processor unit. The communications unit is configured to receive a data transaction from a remote device. The data transaction includes a first transaction value and a second transaction value. The processor unit is programmed to validate the first transaction value and the second transaction value and, when validating the first transaction value fails, to associate an error state with the data transaction. The presentation interface is configured to present a validation failure notification including a data transaction link and, when the data transaction link is selected, to present the first transaction value and the second transaction value. The first transaction value is distinguished from the second transaction value based on the failed validation.

In yet another aspect, one or more computer readable media having computer-executable components is provided. The computer-executable components include a transaction receiving component, a validation component, and a display component. When executed by at least one processor unit, the transaction receiving component causes the at least one processor unit to receive a data transaction including a plurality of transaction values. When executed by at least one processor unit, the validation component causes the at least one processor unit to validate at least a portion of the transaction values to create a set of zero or more erroneous transaction values and a set of zero or more non-erroneous transaction values. When executed by at least one processor unit, the display component causes the at least one processor unit to display the transaction values. Erroneous transaction values are graphically distinguished from non-erroneous transaction values.

The features, functions, and advantages that have been discussed can be achieved independently in various embodiments or may be combined in yet other embodiments further details of which can be seen with reference to the following description and drawings.

DETAILED DESCRIPTION

The described embodiments are directed to the execution and correction of data transactions from a data provider. In an exemplary embodiment, a database of the data provider is replicated by a server that repeatedly receives data transactions representing updates to the replicated data.

When an invalid value is present within a data transaction, a user is notified and provided a link to the transaction. When the link is selected, transaction details, including the invalid fields, are provided to the user. The user may generate a correction request and transmit it to the data provider. If the transaction has not been corrected after a predetermined duration, the user may be reminded of the outstanding error. Embodiments provided herein facilitate quickly correcting invalid data received from a data provider.

Figure 1:
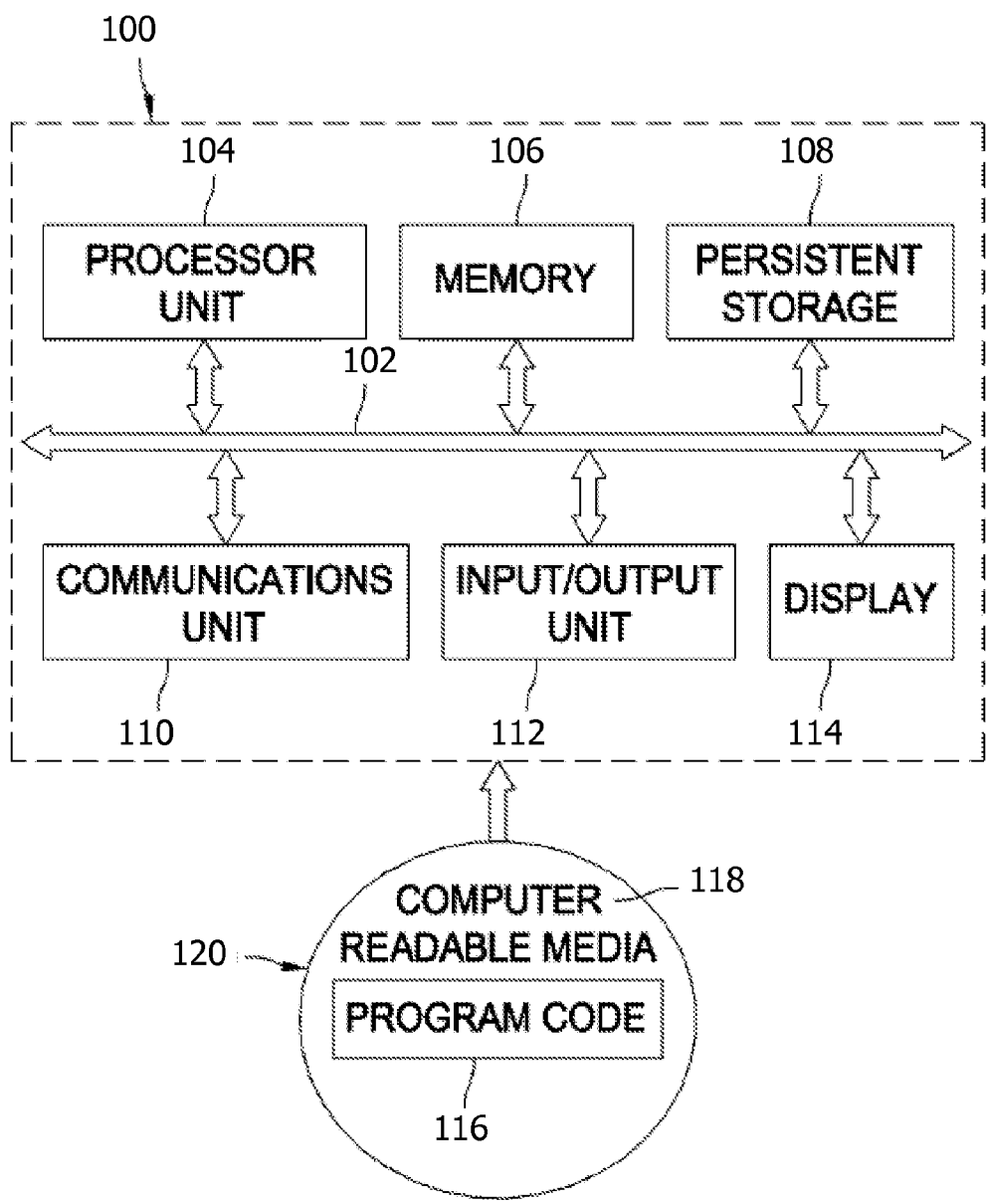
FIG. 1 is a block diagram of an exemplary computer system.

FIG. 1 is a block diagram of an exemplary computer system 100. In the exemplary embodiment, computer system 100 includes communications fabric 102 that provides communications between a processor unit 104, a memory 106, persistent storage 108, a communications unit 110, an input/output (I/O) unit 112, and a presentation interface, such as a display 114. In addition to, or in the alternative, the presentation interface may include an audio device (not shown) and/or any device capable of conveying an output to a user.

Processor unit 104 executes instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, without limitation, a random access memory or any other suitable volatile or non-volatile storage device. Persistent storage 108 may take various forms depending on the particular implementation. For example, without limitation, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, without limitation, a removable hard drive may be used for persistent storage 108.

Communications unit 110, in these examples, provides communications with other computer systems or devices. In these examples, communications unit 110 is a network interface card. Communications unit 110 may communicate through the use of either, or both, physical and wireless communication links.

Input/output unit 112 allows input and output of data with other devices that may be connected to computer system 100. For example, without limitation, input/output unit 112 may provide a connection for user input through a user input device, such as a keyboard and/or a mouse. Further, input/output unit 112 may transmit output to a printer. Display 114 provides a mechanism to display information to a user. For example, a presentation interface such as display 114 may display a graphical user interface, such as those described herein.

In the exemplary embodiment, instructions for the operating system and applications or programs are located on persistent storage 108. These instructions may be loaded into memory 106 for execution by processor unit 104. The processes of the different embodiments may be performed by processor unit 104 using computer implemented instructions and/or computer-executable instructions, which may be located in a memory, such as memory 106. Such instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located on computer readable media 118 that is selectively removable and that enables such instructions to be loaded onto or transferred to computer system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to computer system 100. The tangible form of computer readable media 118 is also referred to as computer recordable storage media. In some instances, computer readable media 118 may not be removable.

Alternatively, program code 116 may be transferred to computer system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another device or computer system for use within computer system 100. For instance, program code stored in a computer readable storage medium in a server computer system may be downloaded over a network from the server to computer system 100. The computer system providing program code 116 may be a server computer, a client computer, or some other device capable of storing and transmitting program code 116.

Program code 116 may be organized into computer-executable components that are functionally related. For example, program code 116 may include a transaction receiving component, a validation component, a display component, and/or any component suitable for the methods described herein. Each component may include computer-executable instructions that, when executed by processor unit 104, cause processor unit 104 to perform one or more of the operations described herein.

The different components illustrated for computer system 100 are not meant to provide architectural limitations to the manner in which different embodiments may be implemented. The different illustrative embodiments may be implemented in a computer system including components in addition to or in place of those illustrated for computer system 100. Other components shown in FIG. 1 can be varied from the illustrative examples shown. For example, a storage device in computer system 100 is any hardware apparatus that may store data. Memory 106, persistent storage 108 and computer readable media 118 are examples of storage devices in a tangible form.

In another example, communications fabric may be implemented as a bus system and may include one or more buses (not shown), such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
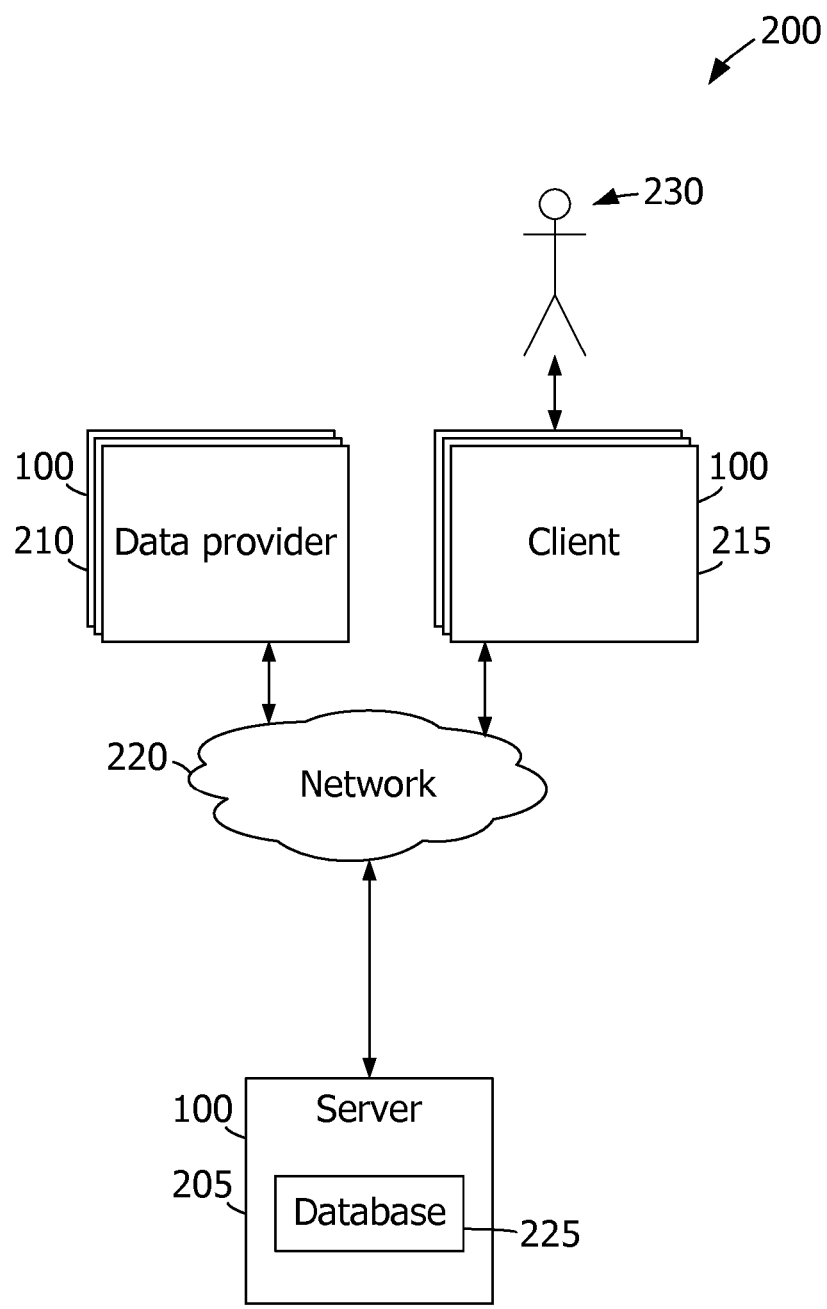
FIG. 2 is a block diagram illustrating an exemplary system that may be used in executing a data transaction.

FIG. 2 is a block diagram of an exemplary system 200 that may be used to execute a data transaction. In the exemplary embodiment, system 200 includes a server 205, a data provider 210, and a client computer system 215 coupled in communication via a network 220. Network 220 may include, without limitation, the Internet, a local area network (LAN), a wide area network (WAN), a wireless LAN (WLAN), a mesh network, and/or a virtual private network (VPN).

Server 205, data provider 210, and client computer system 215 are separate examples of computer system 100 (shown in FIG. 1). In the exemplary embodiment, each computing device 100 is coupled to network 220 via communications unit 110. In an alternative embodiment, server 205 is integrated with data provider 210 and/or with client computer system 215.

Server 205 includes a database 225 that may be stored in memory 106. In the exemplary embodiment, database 225 is a relational database, a hierarchical database, an object oriented database, and/or any structured set of data. In one embodiment, database 225 stores manufacturing data, such as part data, assembly data, and/or inventory data.

Server 205 receives data transactions from one or more data providers 210 and validates transaction values within the received data transactions. Data providers 210 may include, but are not limited to only including, computer systems associated with parts suppliers, service providers, customers, and/or distributors. Data transactions provided by data provider 210 correspond to database 225. For example, a data transaction may represent an update to a record within database 225 or an addition of a new record that references another record within database 225.

Server 205 also interacts with one or more client computer systems 215. In an exemplary embodiment, server 205 provides validation failure notifications and/or transaction details, such as transaction values and transaction status, to client computer system 215.

Client computer system 215 interacts with a user 230 (e.g., via user input/output unit 112 and/or display 114, shown in FIG. 1). User 230 may include, without limitation, a database administrator.

In some embodiments, client computer system 215 is remote to server 205 and/or data provider 210. For example, client computer system 215 may be located at a support facility that is geographically removed from server 205. Such embodiments facilitate remotely identifying, communicating, and correcting transaction errors.

Figure 3:
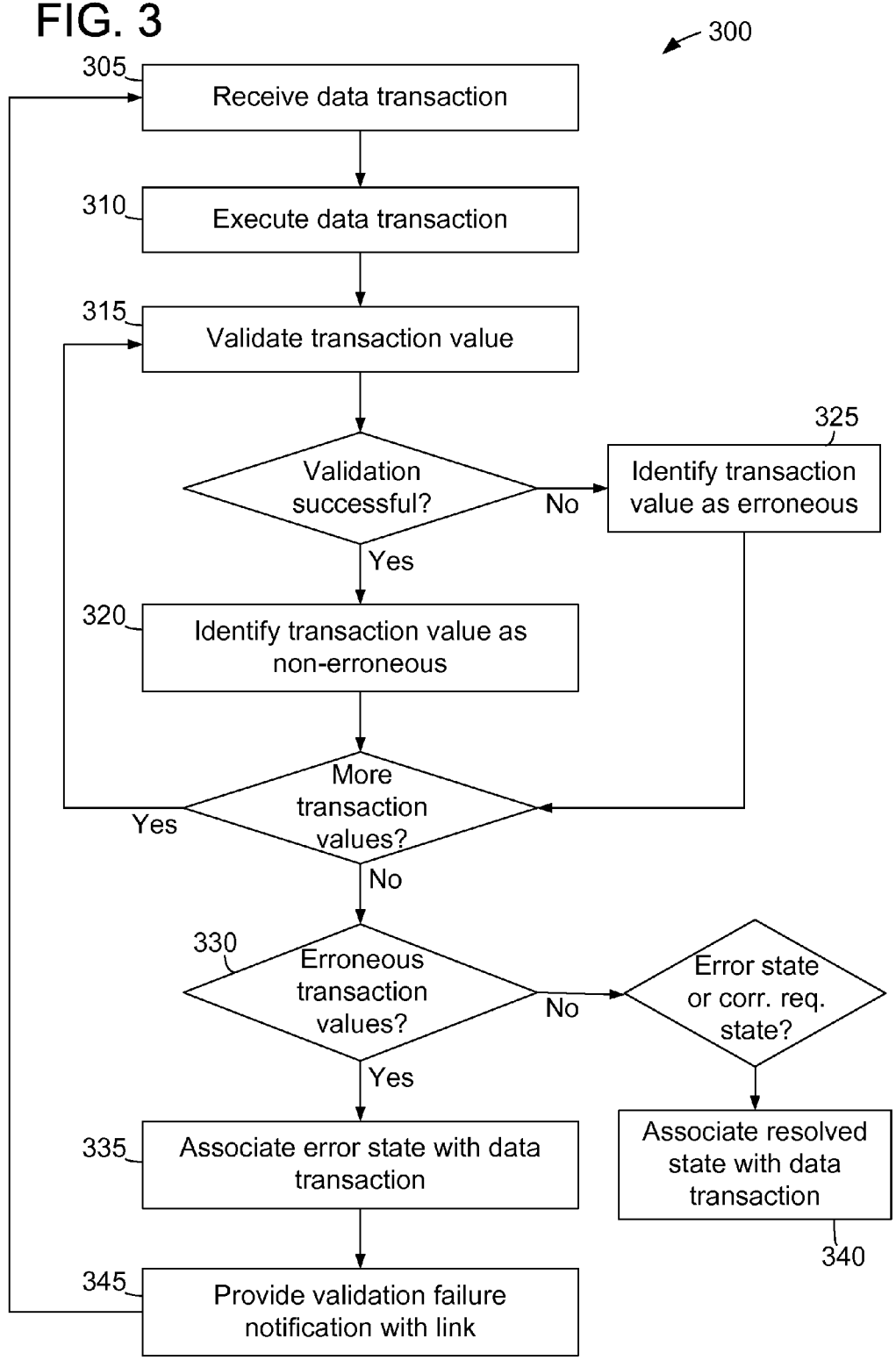
FIG. 3 is a flowchart of an exemplary method for use in executing a data transaction.

FIG. 3 is a flowchart of an exemplary method 300 for use in executing a transaction. All or a portion of method 300 may be performed by one or more computer systems 100, such as, without limitation, server 205, data provider 210, and/or client computer system 215 (shown in FIGS. 1 and 2).

In the exemplary embodiment, method 300 is performed by server 205 and includes receiving 305 a data transaction from data provider 210. The data transaction represents an addition, a modification, and/or a deletion of data and includes one or more transaction values. Server 205 executes 310 the data transaction, storing one or more transaction values of the data transaction in database 225 (shown in FIG. 2).

At least one of the transaction values is validated 315 by server 205. For example, validation 315 may be performed by applying one or more validation rules to a transaction value(s). Validation rules may specify, for example, a data type, a range or set of legal values, a semantic requirement, a referential integrity requirement, and/or any other requirement that facilitates ensuring data stored in database 225 is valid.

If the validation 315 is successful, the transaction value is identified 320 as normal or non-erroneous. If the validation fails, the transaction value is identified 325 as erroneous. In one embodiment, a transaction value is identified 320 as non-erroneous or identified 325 as erroneous by adding the transaction value to a non-erroneous transaction value set or an erroneous transaction value set, respectively.

Validation 315 may be performed for multiple transaction values within a data transaction. In one embodiment, all transaction values associated with a validation rule are validated 315.

Server 205 determines 330 whether any erroneous transaction values are present within the data transaction. In one embodiment, server 205 determines 330 whether an erroneous transaction value set includes at least one transaction value.

If one or more erroneous transaction values are present, server 205 associates 335 an error state with the data transaction. If no erroneous transaction values are present, the data transaction is considered free of errors. If the error-free data transaction is a revised transaction corresponding to a data transaction that was previously associated 335 with an error state, a resolved state is associated 340 with the data transaction, and the error state is removed.

If erroneous transaction values are present, server 205 also provides 345 a validation failure notification, including a transaction link, to a user. A validation failure notification may be provided 345 as an email message, an application software message, a network transmission, a publication to a message queue, a short message service (SMS) message, and/or any message suitable for receipt by client computer system 215. The transaction link is a reference to the data transaction. In one embodiment, the transaction link is a uniform resource locator (URL), such as an address of a service for viewing the data transaction at server 205.

Figure 4:
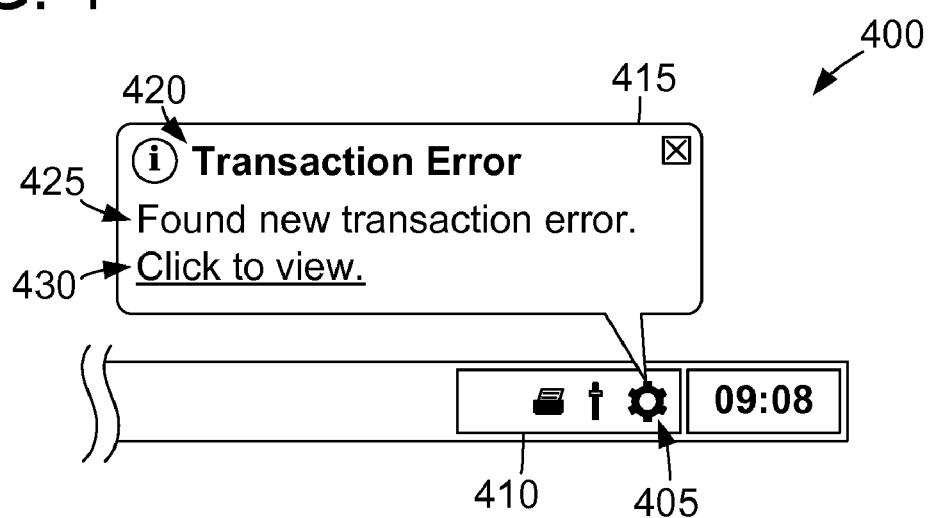
FIG. 4 is an exemplary user interface for use in displaying a validation failure notification.

FIG. 4 is an exemplary user interface 400 that may be used to display a validation failure notification. User interface 400 may be presented by server 205 and/or by client computer system 215 (shown in FIG. 2). In one exemplary embodiment, client computer system 215 executes a transaction monitoring software application, which displays a monitor icon 405 in a status area 410 of user interface 400. In one embodiment, status area 410 is a "system tray" or a "dock" of a graphical desktop interface.

In the exemplary embodiment, server 205 provides 345 (shown in FIG. 3) a validation failure notification by transmitting the validation failure notification to client computer system 215. Providing 345 the validation failure notification may also include, in response to receiving a validation failure notification, displaying a message area 415 to user 230 (shown in FIG. 2) by client computer system 215. In one embodiment, message area 415 is provided 345 when a notification is received and is concealed when user 230 dismisses message area 415 and/or after a predetermined duration (e.g., 5 seconds, 10 seconds, or 30 seconds). In such an embodiment, message area 415 may be referred to as a dynamic message area. Client computer system 215 may also graphically distinguish monitor icon 405 from the appearance of monitor icon 405 when no validation failure notification has been received. For example, monitor icon 405 may be animated and/or displayed in a different color to indicate a validation failure.

In the exemplary embodiment, message area 415 includes a title 420 of "Transaction Error" and a description 425. Title 420 and description 425 indicate that a transaction validation error has occurred and that the data transaction is associated with an error state. Message area 415 also includes a link 430 that is associated with the transaction link received from server 205. For example, link 430 may correspond to a URL for viewing one or more data transactions. In some embodiments, description 425, title 420, and/or message area 415 functions as link 430.

When user 230 selects link 430, client computer system 215 requests data transaction information form server 205.

For example, client computer system 215 may transmit a data transaction request (e.g., a Hypertext Transfer Protocol request) corresponding to a URL associated with link 430.

Figure 5:
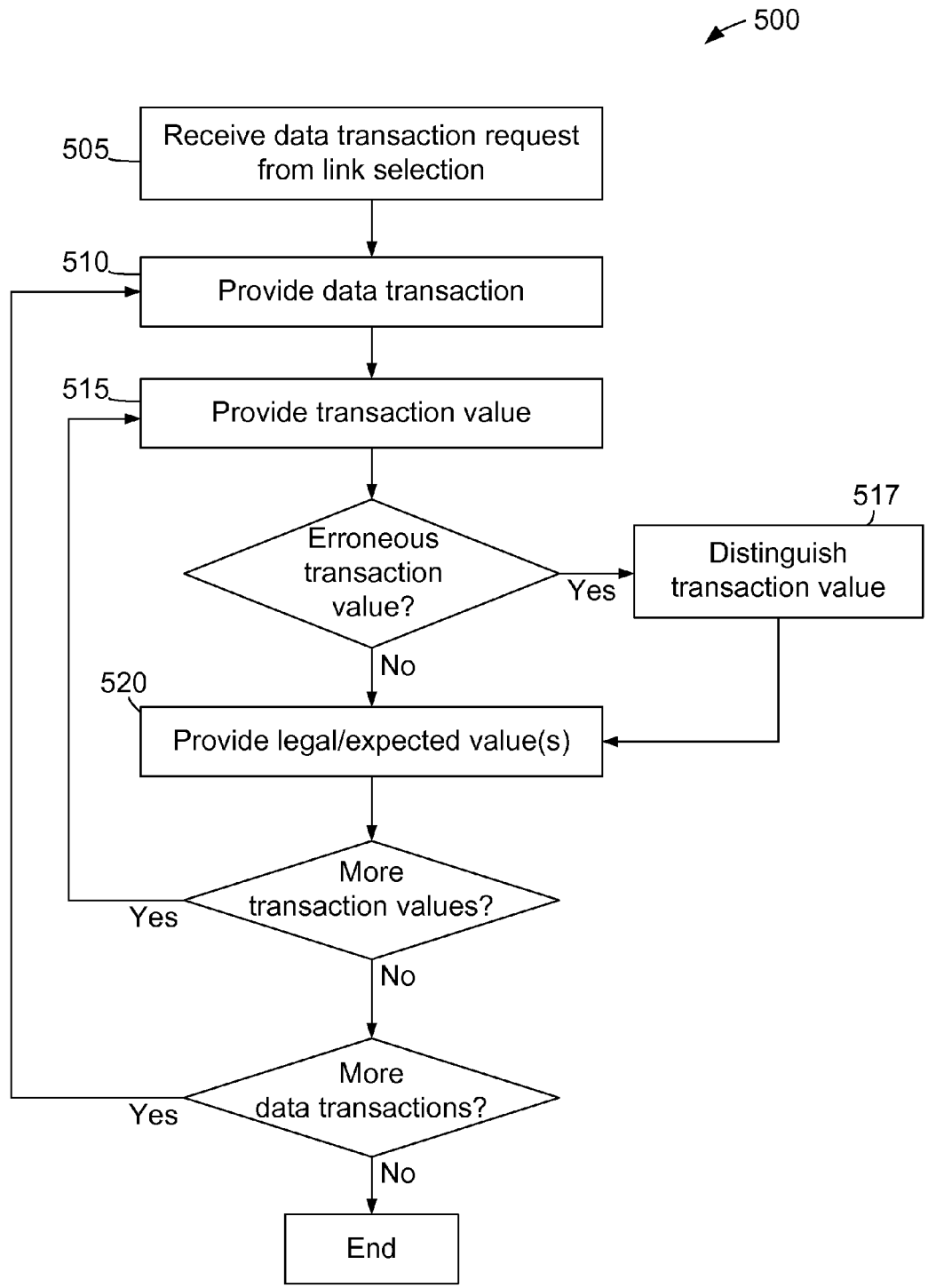
FIG. 5 is a flowchart of an exemplary method for providing erroneous transaction values.

FIG. 5 is a flowchart illustrating an exemplary method 500 for providing erroneous transaction values. In an exemplary embodiment, method 500 is executed by server 205 and/or client computer system 215 (shown in FIG. 2). A data transaction request is received 505 from client computer system 215. For example, the data transaction request may be generated in response to the selection of link 430 (shown in FIG. 4) and transmitted by client computer system 215 to server 205.

A data transaction is provided 510 by server 205. In one embodiment, the data transaction is the data transaction referenced by the selected link 430. In another embodiment, multiple data transactions, including the referenced data transaction, are provided 510.

The data transaction includes one or more transaction values. At least one transaction value is provided 515 and, if the transaction value is erroneous, server 205 distinguishes 517 the transaction value. For example, distinguishing 517 the transaction value may include, but is not limited to only including, assigning an attribute, such as a descriptive attribute or a presentation attribute, of the transaction value to indicate an error. A presentation attribute (e.g., a color and/or a font weight) may be used to graphically distinguish an erroneous transaction value from a non-erroneous transaction value. A descriptive attribute indicates that the transaction value is erroneous and may be used by client computer system 215 to determine one or more presentation attributes for the transaction value.

In some embodiments, a legal or expected value corresponding to the transaction value is provided 520. In one embodiment, an expected value is provided 520 only for erroneous transaction values.

Method 500 may be performed to provide 515 all or a portion of the transaction values within a data transaction to client computer system 215. Further, server 205 may provide 510 a plurality of data transactions to client computer system 215. For example, server 205 may provide 510 all data transactions associated with an error state and/or all data transactions associated with a correction request state.

Figure 6:
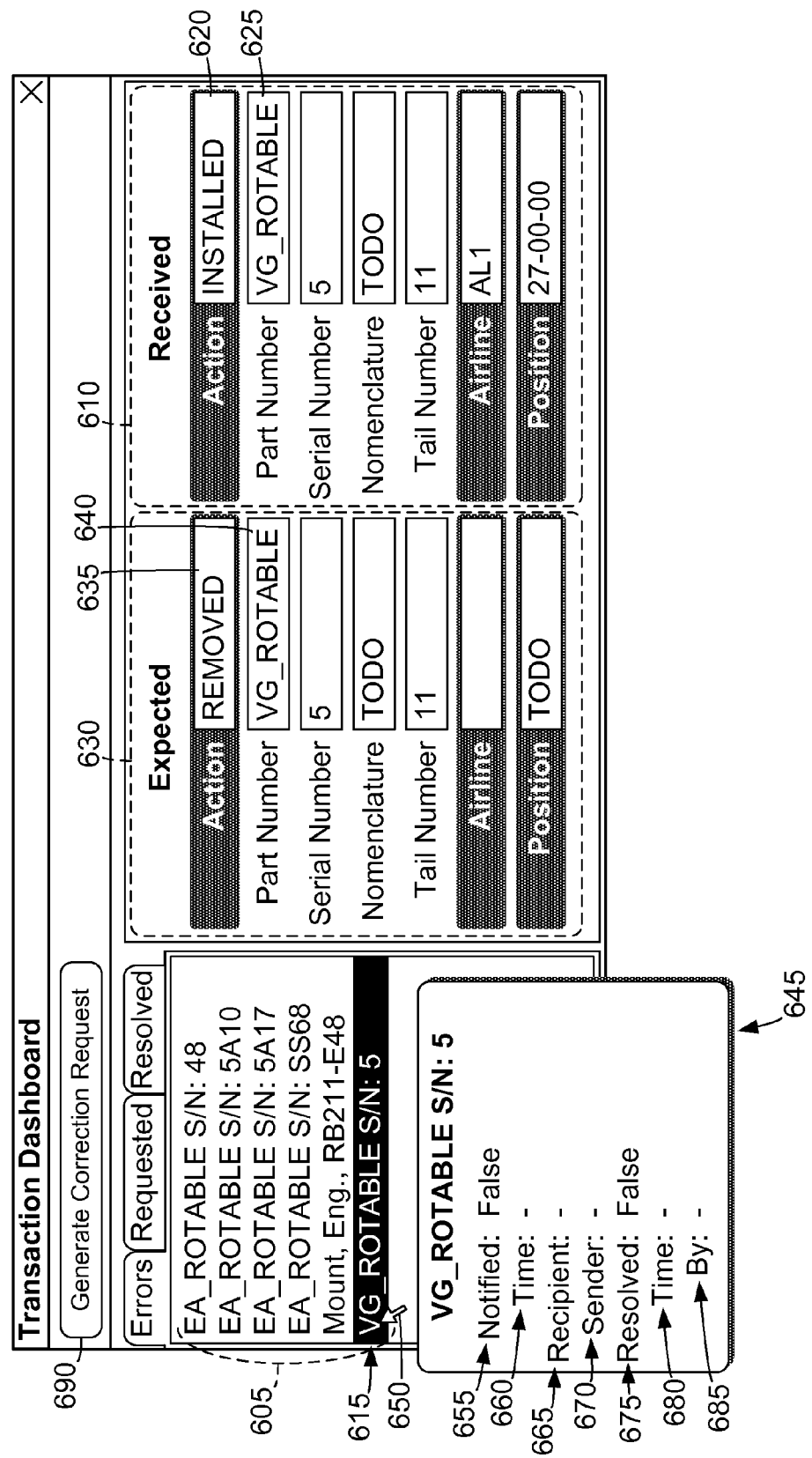
FIG. 6 is an exemplary user interface for use in displaying data transactions and transaction values.

FIG. 6 is an exemplary user interface 600 for displaying data transactions and transaction values. User interface 600 may be provided by server 205 and/or by client computer system 215 (shown in FIG. 2). In one embodiment, user interface 600 is generated by server 205, transmitted by server 205 to client computer system 215, and displayed by client computer system 205. Information displayed in user interface 600 may be provided by database 225 (shown in FIG. 2).

User interface 600 displays one or more data transactions. In the exemplary embodiment, user interface 600 displays data transactions associated with an error state 605. In addition to, or alternative to, user interface 600 may display data transactions associated with a correction-requested state (i.e., data transactions for which a correction request message has been sent) and/or data transactions associated with a resolved state (i.e., erroneous data transactions which have been corrected).

Data transactions 605 are displayed with information, such as an identifier, a name, a part number, and/or a serial number, that enables a user to identify data transactions 605. When a data transaction 605 is selected, user interface 600 displays transaction information, such as transaction values 610. In the exemplary embodiment, displayed transaction values 610 are associated with a selected data transaction 615.

In some embodiments, erroneous transaction values are emphasized and/or distinguished (e.g., graphically distinguished) from non-erroneous transaction values. Graphical distinction may be accomplished by applying a pattern (e.g., a line pattern or a background pattern), a color (e.g., a background color or a foreground color), a line weight, a typeface, a font weight, an animation (e.g., fading and/or blinking), a proximately positioned icon, and/or any other suitable means for distinguishing graphical elements from one another. In the exemplary embodiment, a first transaction value 620 is an erroneous transaction value, and a second transaction value 625 is a non-erroneous transaction value. First transaction value 620 is displayed with a dark background color, and second transaction value 625 is displayed with a light background color to graphically distinguish first transaction value 620 from second transaction value 625.

User interface 600 may also present legal and/or expected values 630 that are associated with transaction values 610. Expected values 630 indicate one or more values that are appropriate for entry into database 225. For example, expected values 630 may correspond to predetermined reference data, such as a static set of legal values. In another example, expected values 630 represent data that existed within database 225 prior to execution of selected data transaction 615.

In the exemplary embodiment, expected values 630 are displayed in juxtaposition with associated transaction values 610. For example, a first expected value 635 is displayed adjacent to first transaction value 620, and a second expected value 640 is displayed adjacent to second transaction value 625. First transaction value 620 does not match first expected value 635 and is considered erroneous. Second transaction value 625 does match second expected value 640 and is considered non-erroneous. Providing expected values 630 facilitates indicating the reason that server 205 has determined a transaction value 610 is considered erroneous.

In the exemplary embodiment, expected values 630 associated with erroneous transaction values 610 are graphically distinguished from expected values 630 associated with non-erroneous transaction values 610. In an alternative embodiment, expected values 630 are not graphically distinguished from each other.

In some embodiments, user interface 600 displays transaction details 645 other than transaction values 610. For example, transaction details 645 may be displayed when a cursor 650 is positioned over a data transaction 605. In the exemplary embodiment, cursor 650 is positioned over selected data transaction 615, and transaction details 645 corresponding to selected data transaction 615 are displayed. Transaction details 645 include a correction request sent indicator 655, a correction request timestamp 660, a correction request recipient 665, and a correction request sender 670. Transaction details 645 also include a resolved indicator 675, a resolved timestamp 680, and a resolving user 685. In the exemplary embodiment, selected data transaction 615 is associated with an error state. No correction request has been sent for selected data transaction 615, as shown by correction request sent indicator 655, and selected data transaction 615 has not been resolved, as shown by resolved indicator 675. Accordingly, correction request timestamp 660, correction request recipient 665, correction request sender 670, resolved timestamp 680 and resolving user 685 are undefined.

User interface 600 also includes a correction request option, shown as correction request button 690. When correction request button 690 is selected, user interface 600 submits a request for generation of a correction request associated with selected data transaction 615. In response, client computer system 215 and/or server 205 generates a correction request message, as described with reference to FIG. 7.

Figure 7:
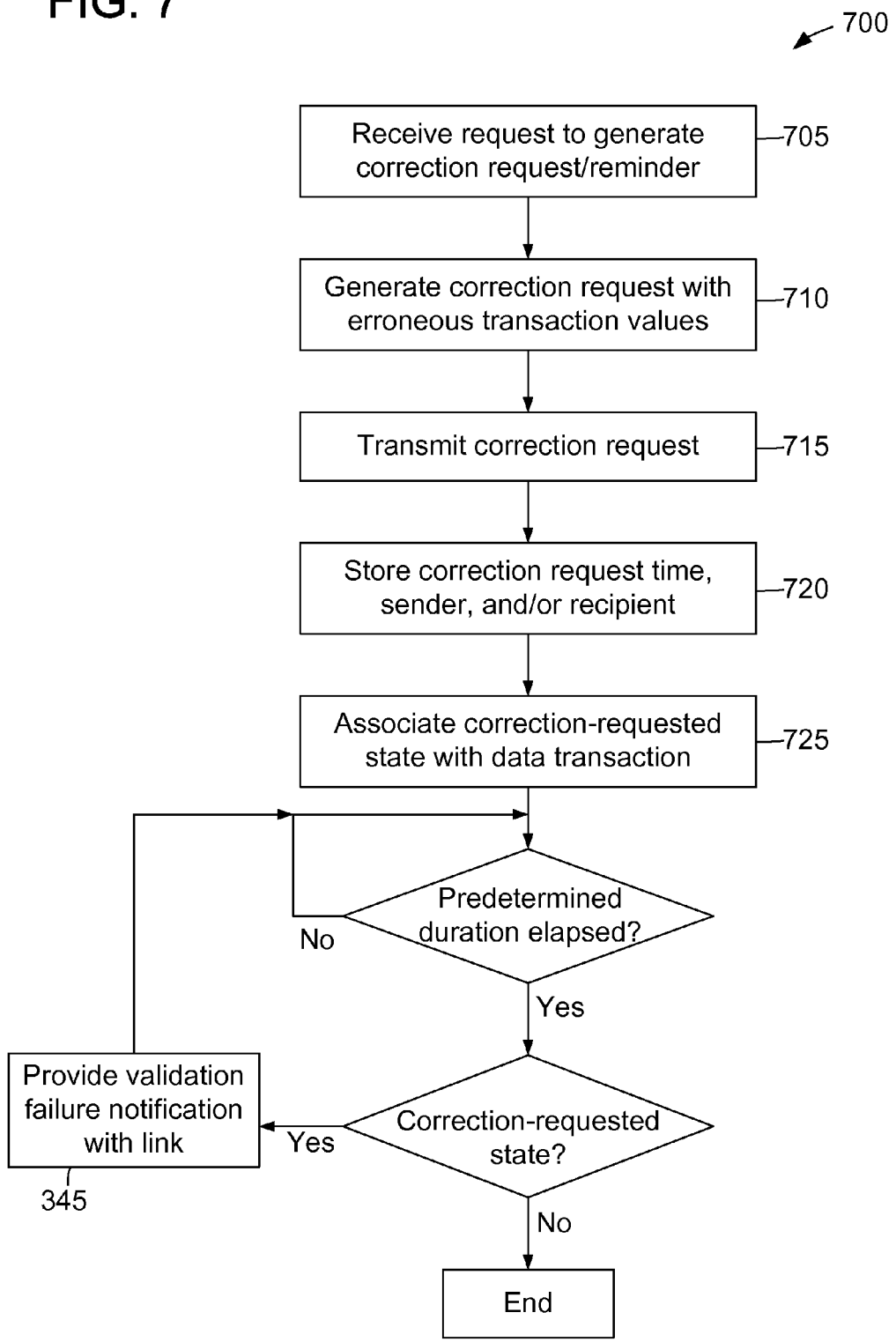
FIG. 7 is a flowchart of an exemplary method for transmitting a correction request.

FIG. 7 is a flowchart illustrating an exemplary method 700 for transmitting a correction request. Referring to FIGS. 6 and 7, in the exemplary embodiment, a computer system 100, such as client computer system 215 (shown in FIG. 2), receives 705 a request to generate a correction request from user interface 600.

Client computer system 215 generates 710 a correction request message including erroneous transaction values, such as first transaction value 620, that are associated with selected data transaction 615. In one embodiment, the correction request message also includes expected values 630 corresponding to the erroneous transaction values. For example, the correction request message may include text such as "Action: expected: REMOVED but was: INSTALLED" for first transaction value 620. The correction request message may also include any other information associated with selected data transaction 615, such as an identifier, a name, a part number, and/or a serial number.

Client computer system 215 transmits 715 the correction request message to a recipient (e.g., a user or a message account) associated with data provider 210 (shown in FIG. 2). In one embodiment, the correction request message is transmitted 715 as an email message. In addition to, or alternative to, the correction request message may be transmitted as a Short Message Service (SMS) message, a publication to a message queue, and/or any other message suitable to notify a user associated with data provider 210 that a correction is required for selected data transaction 615. The recipient may be provided by user 230 (shown in FIG. 2) or may be automatically determined by client computer system 215. For example, client computer system 215 may have previously stored the recipient in association with data provider 210, database 225, and/or selected data transaction 615.

Client computer system 215 stores 720 the time (including the date) at which the correction request message was transmitted 715, the sender of the correction request message (e.g., user 230), and/or the recipient of the correction request message. For example, the time, the sender, and/or the recipient may be stored in memory 106 and/or persistent storage 108 (shown in FIG. 1).

A user associated with data provider 210 receives the correction request message. In response, the user transmits, via data provider 210, a revised data transaction corresponding to originally transmitted data transaction. Referring again to FIG. 3, server 205 receives 305 the revised data transaction, executes 310 the revised data transaction, and validates 315 the transaction values within the revised data transaction. If the revised data transaction contains no erroneous data, and the data transaction was previously associated 335 with an error state or associated 725 with a correction-requested state, a resolved state is associated 340 with the original data transaction, and the error state and/or correction-requested state is removed.

In some embodiments, server 205 and/or client computer system 215 provide a reminder if a data transaction remains in a correction-requested state. In the exemplary embodiment, after a predetermined duration (e.g., 2 hours, 4 hours, 24 hours, or 48 hours) has elapsed, if the data transaction is still associated with a correction-requested state, server 205 again provides 345 (shown in FIG. 3) a validation failure notification with a link to the data transaction. This subsequent validation failure notification may be referred to as a validation failure reminder.

Figure 8:
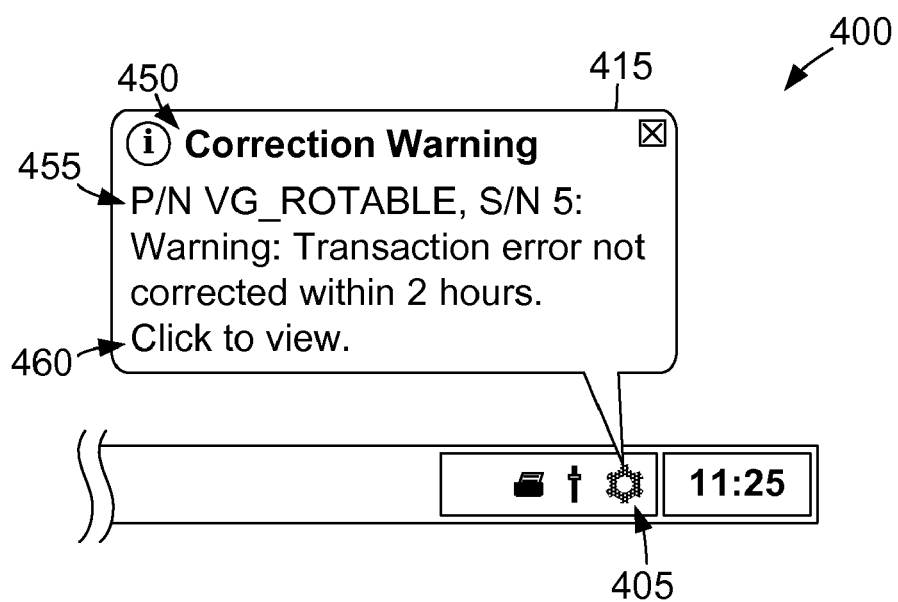
FIG. 8 is an exemplary validation failure reminder that may be displaying using the user interface shown in FIG. 4.

FIG. 8 is an example of user interface 400 (shown in FIG. 4) displaying a validation failure reminder. In the exemplary embodiment, client computer system 215 displays message area 415 in response to receiving a verification failure reminder from server 205. In addition to, or alternative to, client computer system 215 may also graphically distinguish monitor icon 405 from the appearance of monitor icon 405 when displaying a validation failure notification and/or when displaying no notification or reminder.

In the exemplary embodiment, message area 415 includes a title 450 of "Correction Warning", indicating that the data transaction is associated with a correction-requested state. A description 455 indicates that the data transaction has not been associated within the predetermined duration. In the exemplary embodiment, the predetermined duration is 2 hours. Message area 415 also includes a link 460 that is associated with the transaction link received from server 205. When user 230 (shown in FIG. 2) selects link 460, client computer system 215 may display user interface 600 (shown in FIG. 6) with the data transaction corresponding to link 460 selected.

Referring again to FIG. 7, server 205 may repeatedly (e.g., periodically) provide 345 a validation failure notification and/or validation failure reminder while the data transaction remains associated with an error state and/or a correction-requested state. For example, a validation failure reminder may be provided 345 each time the predetermined duration elapses.

Embodiments described herein enable automated notification of errors associated with data transactions received from one or more data providers and executed against a database. A correction request including details of such errors may be generated and sent to a user that is associated with the data provider. If the errors remain unresolved after sending a correction request, validation failure reminders may be provided periodically to a user associated with the database. Accordingly, erroneous data within the database may be quickly identified and corrected.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in correcting a data transaction, said method comprising:
    receiving at a computer system a data transaction from a remote data provider, the data transaction including at least a plurality of transaction values;
    validating by the computer system at least a portion of the transaction values to create a set of zero or more erroneous transaction values and a set of zero or more non-erroneous transaction values;
    associating, when the set of erroneous transaction values includes at least one transaction value, an error state with the data transaction and providing a validation failure notification that includes a data transaction link to a user; and
    providing, when the data transaction link is selected, the transaction values via a presentation interface, wherein erroneous transaction values are distinguished from non-erroneous transaction values.

2. A method in accordance with claim 1, wherein each erroneous transaction value is associated with at least one legal value, and said method further comprises providing the legal values associated with the erroneous transaction values via the presentation interface.

3. A method in accordance with claim 1, further comprising:
generating by the computer system a correction request message that includes the erroneous transaction values; and
storing a correction request time at which the correction request message is sent to a user associated with the remote data provider.

4. A method in accordance with claim 3, wherein the data transaction is an original data transaction, said method further comprising:
receiving a revised data transaction from the remote data provider, wherein the revised data transaction corresponds to the original data transaction and includes a plurality of transaction values; and
when the revised data transaction includes no erroneous data values, associating the original data transaction with a resolved state.

5. A method in accordance with claim 3, further comprising, presenting, when a predetermined duration has elapsed since the correction request time, a validation failure reminder if the data transaction is not associated with a resolved state.

6. A method in accordance with claim 1, wherein providing the transaction values via a presentation interface comprises displaying the transactions values via a display interface.

7. A method in accordance with claim 1, wherein providing the validation failure notification to a user comprises transmitting an email message to the user.

8. A method in accordance with claim 1, wherein providing the validation failure notification to a user comprises displaying the validation failure notification in a dynamic message area of a graphical user interface.

9. A method in accordance with claim 1, wherein the method is terminated when the set of erroneous transaction values includes zero transaction values.

10. A system for use in correcting a data transaction, said system comprising:
a communications unit configured to receive a data transaction from a remote device, the data transaction including a first transaction value and a second transaction value;
a processor unit coupled to said communications unit and programmed to:
validate the first transaction value and the second transaction value; and
when validating the first transaction value fails, associate an error state with the data transaction; and
a presentation interface coupled to said processor unit and configured to:
present a validation failure notification including a data transaction link; and
when the data transaction link is selected, present the first transaction value and the second transaction value, wherein the first transaction value is distinguished from the second transaction value based on the failed validation.

11. A system in accordance with claim 10, wherein the presentation interface is further configured to graphically distinguish the first transaction value from the second transaction value based on the failed validation.

12. A system in accordance with claim 10, wherein the presentation interface is further configured to present an expected value that is associated with the first transaction value.

13. A system in accordance with claim 10, wherein the processor unit is programmed to validate the first transaction value and the second transaction value at least in part by comparing the first transaction value and the second transaction value to expected values within a database.

14. A system in accordance with claim 10, wherein said presentation interface is further programmed to present a correction request option, and, when the correction request option is selected, said processor unit is further configured to generate a correction request message that includes the first transaction value.

15. A system in accordance with claim 14, wherein the data transaction is an original data transaction, said communications unit is further configured to receive a revised data transaction from the remote device, and said processor unit is further programmed to validate transaction values of the revised data transaction.

16. A system in accordance with claim 15, wherein when validation of the transaction values of the revised data transaction is successful, said processor unit is further programmed to remove the error state associated with the original data transaction.

17. A system in accordance with claim 14, further comprising a storage device coupled to said processor unit and configured to store a correction request time at which the correction request is sent and a correction request recipient to whom the correction request is sent.

18. A system in accordance with claim 17, wherein said presentation interface is further configured to present the correction request time and the correction request recipient.

19. A system in accordance with claim 10, wherein the presentation interface is further configured to periodically provide a validation failure notification when the data transaction is not associated with a resolved state.

20. A system in accordance with claim 10, wherein said communications unit is further configured to receive a plurality of data transactions from one or more remote devices, and said processor unit is further programmed to validate transaction values of the plurality of data transactions.

21. One or more non-transitory computer readable media having computer-executable components, said components comprising:
a transaction receiving component that when executed by at least one processor unit causes the at least one processor unit to receive a data transaction including a plurality of transaction values;
a validation component that when executed by at least one processor unit causes the at least one processor unit to validate at least a portion of the transaction values to create a set of zero or more erroneous transaction values and a set of zero or more non-erroneous transaction values, wherein an error state is associated with the data transaction when at least the portion of the transaction values fails; and
a display component that when executed by at least one processor unit causes the at least one processor unit to present a validation failure notification including a data transaction link, and display the transaction values when the data transaction link is selected, wherein erroneous transaction values are graphically distinguished from non-erroneous transaction values.

* * * * *